UNITED STATES PATENT OFFICE.

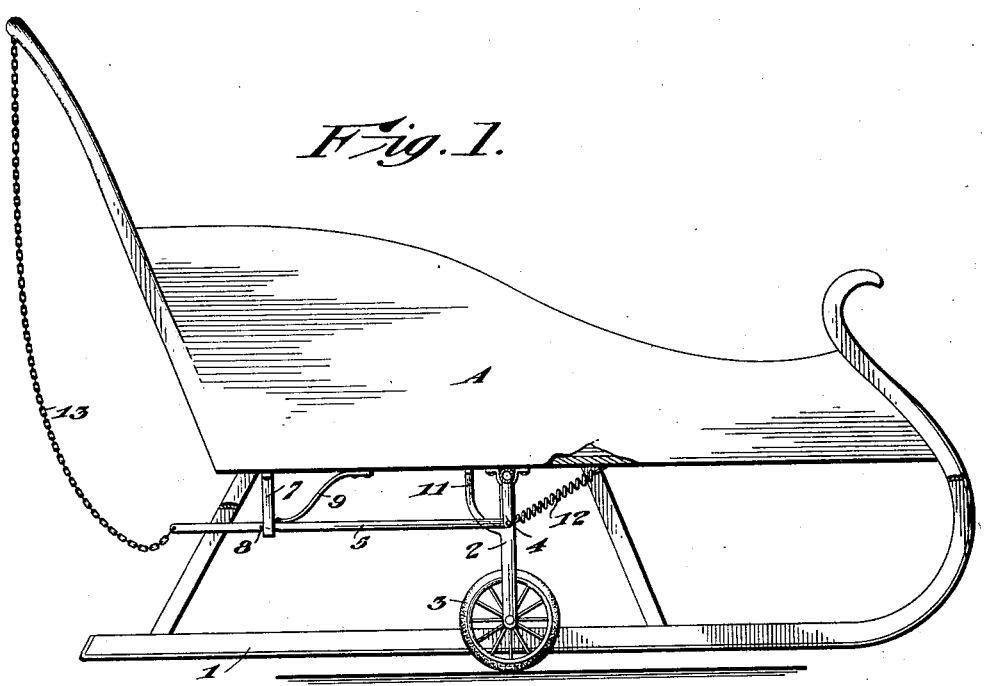
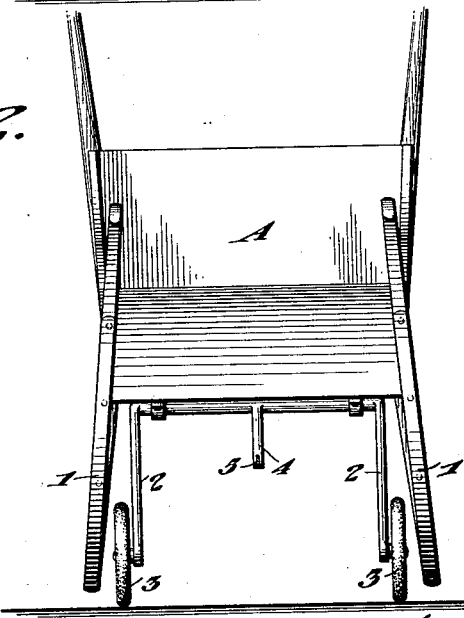

FRANK C. SIMON, OF HORNELL, NEW YORK.

BOX-SLEIGH.

1,007,497.  Specification of Letters Patent.  Patented Oct. 31, 1911.

Application filed March 7, 1911. Serial No. 612,748.

*To all whom it may concern:*

Be it known that I, FRANK C. SIMON, a citizen of the United States, residing at Hornell, in the county of Steuben and State of New York, have invented certain new and useful Improvements in Box-Sleighs, of which the following is a specification.

My invention relates to an improvement in children's box sleighs, and the object is to provide a simple means for operating pivotally mounted wheels, which wheels can be brought into position for use, causing the runners to be raised above the ground, when a portion of the road or sidewalk is encountered where the snow has been removed, and thereby permitting the sleigh to be carried across said surface on the wheels.

The invention consists in certain novel features of construction and combinations of parts which will be hereinafter fully described and pointed out in the claim.

In the accompanying drawings, Figure 1 is a view in side elevation. Fig. 2 is a view in front elevation.

A, represents the sleigh body, and 1, 1, are the runners. The pivoted frame 2 is connected to the body A, and rotatably mounted upon the frame are wheels 3. An arm 4 is connected to the frame, to which is connected a lever 5 for moving the frame for causing the wheels to be moved to a position above the runners 1, or for bringing the wheels into a position where they will come in contact with the surface, and cause the runners to be suspended or raised above the surface. A bracket 7 is connected to the body of the sleigh, which engages a notch 8 in the lever 5 for holding the lever against movement when the wheels are brought into engagement with the surface for carrying the sleigh over the dry or bare portion of the road or sidewalk. A spring 9 is connected to the body of the sleigh which bears against the lever for holding it in locked position on the bracket. Stops 11 are connected to the frame 2, which engage the body of the sleigh for holding the wheels from swinging rearward when brought into engagement with the surface. A coiled spring 12 is connected to the body of the sleigh and to the arm 4 for normally holding the wheels out of engagement with the surface when the runners are in use. A chain 13 is connected to the lever 5, so that the lever can be drawn rearward for drawing the wheels into position to engage the surface and elevating the runners from the ground. The stops 11 limit the rearward movement of the wheels, and the spring 9 will cause the notched portion of the lever to be engaged by the bracket, thereby locking the wheels and frame against oscillatory movement. When it is desired to allow the runners to replace the wheels, the levers can be raised vertically by the hand or foot, and as the spring 12 is under tension, it will cause the wheels to be drawn forward and out of contact with the surface, so that the runners can be used.

Having fully described my invention, what I claim as new and desire to secure by Letters Patent, is:—

The combination with a sleigh body and runners, of a frame pivotally attached beneath the bottom of the body and carrying wheels, a stop connected with said frame on one side of the pivot in position to engage the bottom of the sleigh body when the frame is lowered into vertical position, and a spring extending in the opposite direction to raise the wheels automatically when released, a gravity lever horizontally disposed pivoted at its forward end to the frame and notched at or near its free end, a bracket in position to receive and support the free end of the lever, a spring pressing against said lever to cause the notch to receive the bracket, whereby it is locked when the wheels are lowered, and a flexible device connected with the free end of the lever for raising the latter to cause its disengagement from the bracket when the wheels are to be pulled forward by the action of the spring connecting the frame.

In testimony whereof I affix my signature, in the presence of two witnesses.

FRANK C. SIMON.

Witnesses:
CHARLES W. STEVENS,
SARAH E. HOLLENBECK.

Copies of this patent may be obtained for five cents each, by addressing the "Commissioner of Patents, Washington, D. C."